US006546555B1

United States Patent
Hjelsvold et al.

(10) Patent No.: US 6,546,555 B1
(45) Date of Patent: Apr. 8, 2003

(54) SYSTEM FOR HYPERVIDEO FILTERING BASED ON END-USER PAYMENT INTEREST AND CAPABILITY

(75) Inventors: Rune Hjelsvold, Plainsboro, NJ (US); Remi Depommier, Plainsboro, NJ (US); Yves Léauté, Schmitten (DE); Kangesh Gunaseelan, Seattle, WA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/121,267

(22) Filed: Jul. 23, 1998

(51) Int. Cl.[7] .............................. H04N 7/16; H04N 7/173
(52) U.S. Cl. .............................. 725/1; 725/5; 725/111; 725/112; 725/115
(58) Field of Search .............................. 725/1, 5, 112, 725/115, 111

(56) References Cited

U.S. PATENT DOCUMENTS

| | | | | |
|---|---|---|---|---|
| 5,809,512 A | * | 9/1998 | Kato | 707/502 |
| 6,006,265 A | * | 12/1999 | Rangan et al. | 709/226 |
| 6,061,504 A | * | 5/2000 | Tzelnic et al. | 395/200.49 |
| 6,154,771 A | * | 11/2000 | Rangan et al. | 709/217 |
| 6,169,573 B1 | * | 1/2001 | Sampath-Kumar et al. | 349/169 |
| 6,317,885 B1 | * | 11/2001 | Fries | 725/109 |

* cited by examiner

Primary Examiner—Andrew Faile
Assistant Examiner—Kieu-Oanh Bui
(74) Attorney, Agent, or Firm—Donald B. Paschburg

(57) ABSTRACT

A system for selling digital video information over a communications network such as the Internet basically includes a filtering server and a service administration system. The filtering server includes a commerce server, a streaming server and a world-wide web information server. The world-wide web information server provides customers with a list of available videos, the possibility to customize specific versions and a method for calculating the price for a specific version. The service administration system includes a management tool for the merchant to define price classes and payment schemes and a meta-data editing tool for the merchant to prepare the content for the filtering. The system will connect to external systems to have the payment information verified. If the payment transaction is accepted the system will pass the selected video through a sequence of service filters to generate the edition that the customer selected.

13 Claims, 7 Drawing Sheets

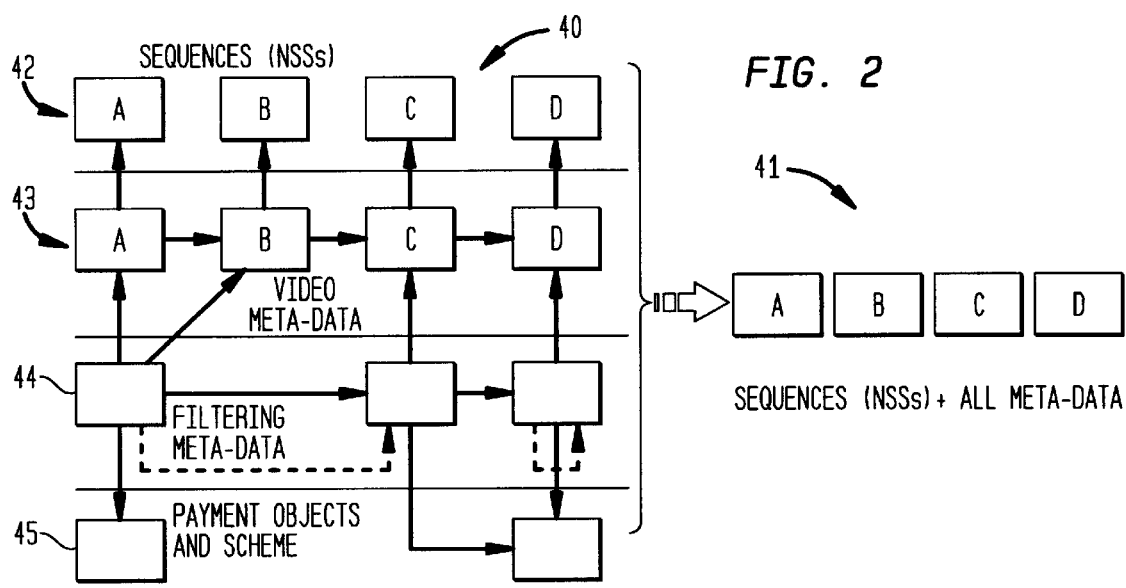
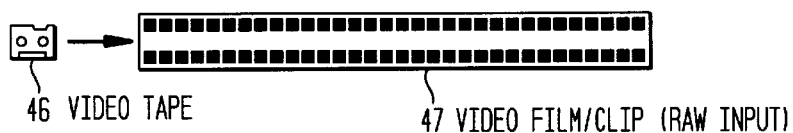
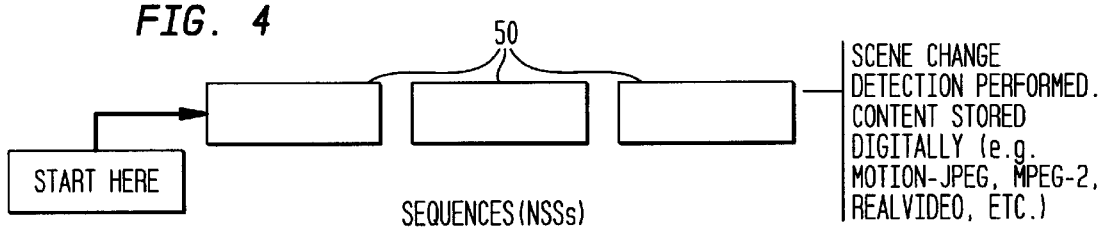
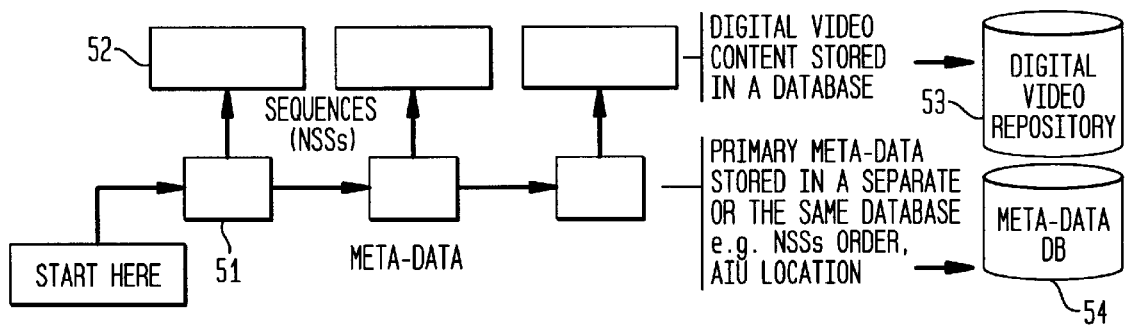

SYSTEM FOR HYPERVIDEO FILTERING BASED ON END-USER PAYMENT INTEREST AND CAPABILITY

BACKGROUND OF THE INVENTION

1. Field of the Invention

The present invention relates to hypervideo filtering and more particularly to providing customers access through a communications network to digital video information stored on a merchant's server.

2. Description of the Prior Art

Electronic commerce over communications networks is becoming an important technology in today's market place. Electronic commerce allows goods and services to be sold over a network and also facilitates the sales and distribution of digital information. At the same time, digital video storage and streaming (i.e., delivery over a network) is becoming a commodity.

Video is a powerful media for documentation, information exchange, and, of course, for entertainment. In a similar way, global communications networks such as the Internet constitute powerful channels for distributing information to customers. Mostly, Internet users have been able to consume the information for free. For content owners, this shopping model is not attractive as it gives few opportunities for increased revenues. There are some content owners and content brokers connected to the Internet today, but only a few give direct access to the information objects. The Internet Movie Database (http://us.imdb.com/), E-online's Movie Finder (http://www.moviefinder.com/), and the Vanderbilt University's Television News Archive (http://tvnews.vanderbilt.edu/) are examples of video archives that can be accessed over the Internet. None of these services gives customers a means to access to the video objects directly today. It is an object of the present invention to provide a system for content owners or brokers to become merchants that can sell video information over a network.

It will be important to such video information merchants to be able to combine video information into several products that can be sold at different prices. A television news merchant, for instance, may want to sell four products: Headline News, International News, National News, and Complete News coverage that are all based on the merchant's repository of video information but provide different views and depth of coverage. The value of each of these products may be different so the merchant may want to be able to price them differently.

It is also important for the merchant to be able to provide this service without prior agreements with each customer individually. The customer's ability to pay should be verified on a single transaction basis and the payment transaction should be completed immediately. With this approach, the merchant can provide such services globally and have the product immediately available at the market place.

In many cases, the video information merchant may want to provide cross-references or hyperlinks between information units in the archive. Hypervideo facilitates such hyperlinking.

Hypervideo, which is described by N. Sawhney, D. Balcom, and I. Smith in "Authoring And Navigating Video In Space And Time", *IEEE Multimedia* 4(4), 30–39, October, 1997 and by W.-h. Ma, Y.-J. Lee, D. H. C. Du and M. P. McCahill in "Video-based Hypermedia For Education-on-demand", *IEEE Multimedia* 5(1), January, 1998, is a non-linear type of video. Hypervideo is consisting of story units called Narrative Sequences of Scenes—NSS (adopted from [Sawhney et al. 1997]) and hyperlinks connecting these story units together. The source and destination node for a hyperlink may be called an Anchorable Information Unit (AIU). In a hypervideo, there are many different types of AIUs. A NSS may itself be an AIU. A temporal or a spatio-temporal region of a NSS may be an AIU (in this case often called hotspot). Any non-video objects such as portions of a hypertext object, pictures, or charts may also be AIUs.

A hypervideo may have several parallel tracks where information is streamed synchronously. For instance, a hypervideo presentation may contain three parallel tracks; one for the video itself, one for a textual transcript of what is being said, and one for an image of the current narrator. Also, there might be several alternative data streams that can be fed into one track. There might be many different sub-titles, for instance, to accomplish multi-lingual sub-titling.

The process of offering different views of hypervideo information can be seen as a filtering process. Thus, the research work done in the area of customized video services by G. Ahanger and T. D. C. Little in "A System For Customized News Delivery From Video Archives", *Proceedings Of The 4$^{th}$ International Conference On Multimedia Computing And Systems,* Ottawa, Canada, June 1997 and as described in U.S. Pat. No. 5,434,678 entitled "Seamless Transmission Of Non-sequential Video Segments" issued to M. Abecassis on Jul. 18, 1995, is relevant for providing video information services over a network. This prior art, however, does not address the issues of hypervideo filtering, for instance filtering of AIUs and hyperlinks. Also, the focus for this prior art is to find the most appropriate way to index the semantic contents of video information and to rank information objects based on how relevant these are according to an end-user interest profile. A video information merchant may not need to, or want to know the end-user interest. Thus, it is an object of the present invention to provide filtering that is based on the end-user's payment choice and capability. This commercial aspect of information filtering has not been addressed by the prior art.

Most of the work in the area of electronic commerce is devoted to generating catalogs from a database of product information, to defining appropriate shopping models and to provide secure payment mechanisms. There is, however, one patent related to the distribution of digital content. This patent is U.S. Pat. No. 5,646,992 entitled "Assembly, Distribution, and Use Of Digital Information", issued to R. J. Subler and T. M. Hastings on Jul. 8, 1997 and assigned to Digital Delivery, Inc. In this system, an encryption scheme using multiple decryption keys is used to give customers access to a subset of items. Each decryption key will permit decryption of all items belonging to a specific subset.

SUMMARY OF THE INVENTION

The present invention provides a system for selling digital video information over a communications network such as the Internet. The information is stored on an information server at a merchant's video information site. Videos are represented as hypervideos consisting of narrative sequences and hyperlinks. Hyperlinks connect anchorable information units within the hypervideo to other anchorable information units within the same hypervideo or to anchorable information units outside of the hypervideo. A video information customer may establish a network connection to the merchant to browse or search a catalog of available video information. When ordering a video, the customer will have several editions of the same video to choose among. Each edition may have a different quality, duration and price than other editions. When the customer selects a given video edition, the customer will also provide the system with electronic payment information, such as credit card information.

The system basically comprises a filtering server and a service administration system. The filtering server comprises a commerce server for initiating electronic payment transactions, a streaming server that delivers purchased videos to the respective customers and a world-wide web information server. The world-wide web information server provides customers with the following; a list of available videos, the possibility to customize specific versions and a method for calculating the price for a specific version. The world-wide web information server also allows the end-user to electronically purchase a specific version and upon positive outcome of an electronic payment transaction, generates the specific version based on multimedia data and descriptive data stored in the system. The world-wide web further returns the reference to the specific version to the customer for viewing. The service administration system comprises a management tool for the merchant to define price classes and payment schemes according to which the information can be priced and a meta-data editing tool for the merchant to prepare the content for the filtering by defining hyperlinks, by categorizing video nodes and hyperlinks according to price classes, and by defining the amount of promotional information to insert and the rules used to control insertion of promotional information.

The system will connect to external systems to have the payment information verified. If the payment transaction is accepted the system will pass the selected video through a sequence of service filters to generate the edition that the customer selected. A reference to the specific edition of the video is then transferred back to the customer to establish a video transfer connection between the customer's video display unit and the video information merchant's video server.

BRIEF DESCRIPTION OF THE DRAWINGS

FIG. 2 illustrates notation convention for hypervideo sequences.

FIG. 3 illustrates a first step of the present invention which is digitizing a video tape.

FIG. 4 illustrates a second step of the present invention which is determining video shots, scenes and narrative sequences.

FIG. 5 illustrates a third step of the present invention which is generating meta-data and building up a hypervideo structure.

DETAILED DESCRIPTION OF THE INVENTION

Figure 1:
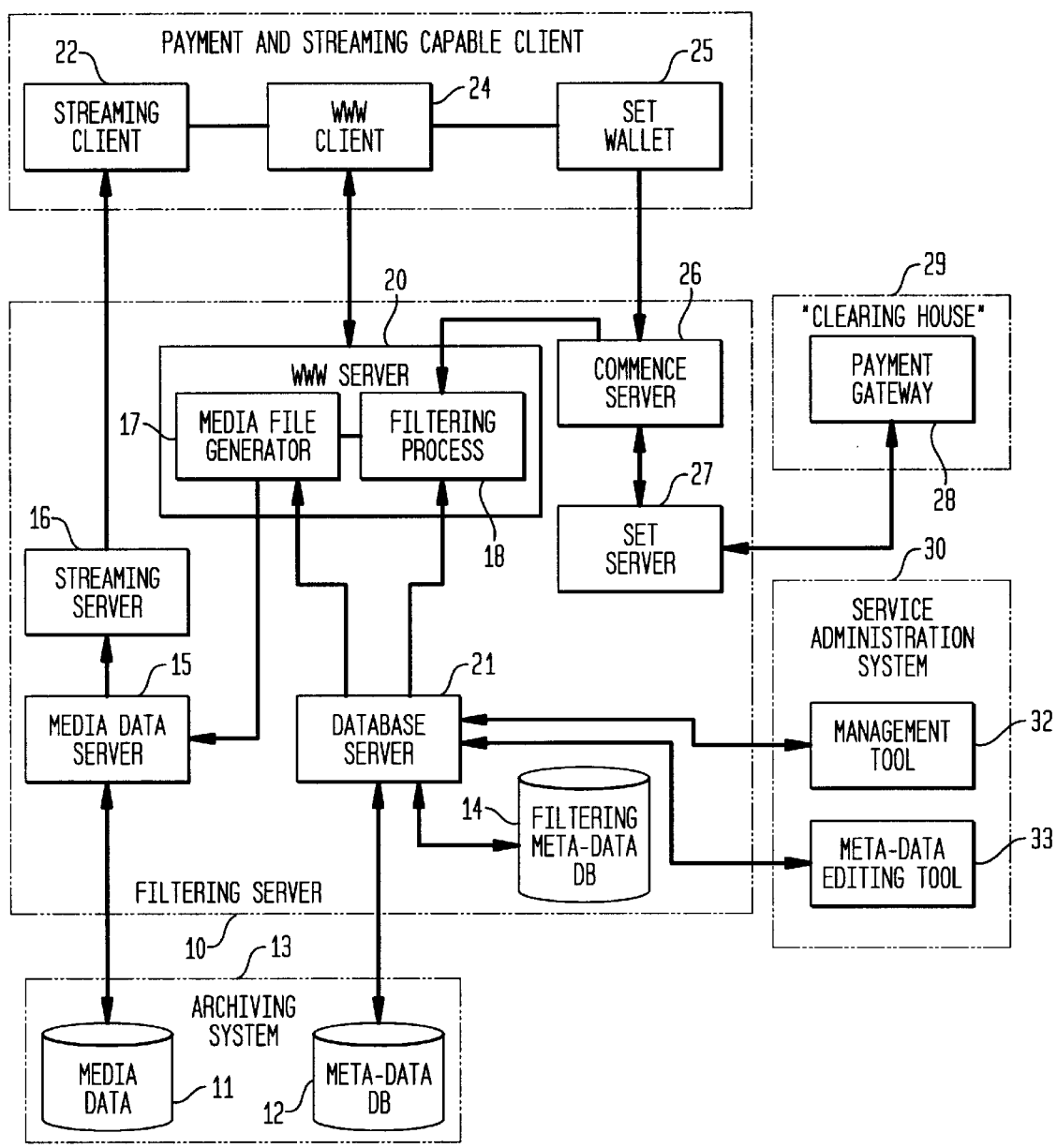
FIG. 1 illustrates a block diagram of the present invention.

FIG. 1 illustrates a block diagram of the present invention. The filtering system of the present invention needs access to three different data repositories. These repositories may be stored separately or may be handled by one, common data manager. Media data repository 11 stores multimedia objects such as text documents, images, audio, and video shots. Meta-data repository 12 stores the properties (encoding, location, etc . . . ) of media objects and descriptions of the contents of multimedia objects. Media data repository 11 and meta-data repository 12 could be contained within filtering server 10, could be contained externally within archiving system 13, or could be contained in two separate locations. Filtering meta-data repository 14 contains filtering meta-data and payment schemes. These repositories are described in more detail below.

Within media data repository 11, Narrative Sequences of Scenes (NSSs) are represented in a digital video file format (for instance in the RealMedia streaming format). Each NSS may be stored as a separate file, or several NSSs may be stored contiguously in one file in the default sequence. Media data repository 11 and media data server 15 are general components that do not store or handle any filtering information. For security reasons, however, media data server 15 and media data repository 11 may consist of two parts; one part which is accessible for streaming server 16 (and, consequently, accessible by the end-user through streaming client 22) and one part which is only accessible for internal components such as media file generator 17.

Media data repository 11 also contains other multimedia objects. Non-video objects may define temporal data streams (for instance audio tracks or closed captioning) or static objects (such as still images and text documents). The output from media file generator 17 is one or more media streaming files where various types of media objects have been merged together. Alternatively, the output from media file generator 17 is one or more script files containing a specification of the resulting multimedia presentation—e.g., in SMIL format (specified in "Synchronized Multimedia Integration Language (SMIL) 1.0 Specification", W3C, Jun. 15, 1998—http://www.w3.ore/TR/1998/REC-smil-19980615. These files will be stored in media data repository 11.

A hypervideo composition meta-data can be represented as a graph of AIUs interconnected by hyperlinks. Meta-data repository 12 stores these graphs as AIU objects and hyperlink objects where hyperlink objects connect a source AIU to one destination AIU. Several hyperlinks may share source AIUs and destination AIUs. Meta-data repository 12 may also contain content indices as described in U.S. patent Application Ser. No. 09/053,761 entitled "System And Methods For Providing Structured Logging, Querying And Navigation For Multimedia Management", filed on Apr. 2, 1998, assigned to the same assignees as the present invention and hereby incorporated by reference.

For payment meta-data, the filtering service of the present invention uses one or more filtering parameters for filtering AIUs and hyperlinks. A filtering parameter is a special type of content indices that is used by the filtering service.

For payment schemes, the filtering meta-data repository 14 defines one or more filtering services and stores the payment schemes that will be used by each of these services. The repository 14 also defines a number of price classes and associates each class with a given price. The information used to represent the individual schemes is: 1) Subscription schemes where various subscription levels are defined. Each subscription level is given a name and is associated with a price class. Also, each subscription level defines which values individual filtering parameters are to take when filtering video for customers subscribing to this level of service and it defines the amount of promotional video insert that can be inserted (in fraction of total playback duration). 2) Fixed price per hypervideo where various version types are defined. Each version type is given a name and is associated with a price class. Also each version type defines which values individual filtering parameters are to take when generating a specific version of a specific hypervideo and it defines the amount of promotional video insert that can be inserted (in fraction of total playback duration). 3) Price calculated from the composed video where each type of information object is associated with a triple of price classes as <static_price, component_factor, duration_factor> allowing each value to be negative, positive, or zero. The static_price class gives the cost of the given information object. The component_factor is used to calculate the price of a given object as being set to the accumulated price of all of the object's components multiplied by the factor. For instance, if a news video contains four news stories—each having a static_price that is mapped to the value of a quarter of a dollar, and the component_factor is set to one, the price of the news video is one dollar. The duration_factor is used to calculate the price of a given object by multiplying the playback duration of the object with the factor. For instance, if a news story lasts for two and a half minutes and the duration_factor is set to ten cents per minute, the price of the news story will be a quarter of a dollar.

Media file generator 17 and filtering process 18 are contained within www server 20. Filtering process 18 is responsible for presenting the appropriate choices to the end-user via www client 24, for computing the price of the selected version of hypervideo, for initiating a payment transaction and for generating a specific filtered version. Filtering process 18 requests meta-data from database server 21 which manages filtering meta-data DB 14 and which interfaces with archiving system 13.

Media file generator 17 takes the input from filtering process 18 to generate file(s) storing the data stream(s) representing the filtered version of the hypervideo. Media file generator 17 may output media files created by cutting and pasting segments from the input files. Alternatively, if supported by streaming server 16, media file generator 17 may generate script files (e.g., SMIL files) instructing streaming server 16 how to create the output stream at streaming time. Media file generator 17 retrieves necessary meta-data from database server 21 and media data (if needed) from media data server 15. Output files are sent to media data server 15 and can later be read by streaming server 16.

For media streaming, streaming server 16 and streaming client 22 are responsible for presenting media data stored on media server 15 to the customer via streaming client 22. For payment, wallet 25, commerce server 26, and Secure Electronic Transaction (SET) server 27 are responsible for initiating a payment transaction and exchanging payment information with payment gateway 28 of clearing house 29.

The merchant uses administrative tools 32 within service administrative system 30, which interfaces with filtering server 10, to define filtering services and payment schemes. Meta-data editing tool 33 allows the merchant to define NSSs and AIUs and to associate filtering meta-data with such elements.

The present invention utilizes different types of data to accomplish the filtering by payment. The notation convention for hypervideo sequences used throughout this description is shown in FIG. 2. Left-hand part 40 of FIG. 2 illustrates how the different types of data relate to each other. As can be seen from FIG. 2, this way of illustrating a hypervideo along with its meta-data tends to be rather complex. To allow a simplified representation of hypervideo sequences, the notation shown on right-hand part 41 of FIG. 2 will also be used for an equivalent representation of sequences of scenes of a hypervideo.

The left part 40 of FIG. 2 illustrates the different types of data that are being used by the filtering system of the present invention. Top level 42 consists of the individual narrative sequences in the hypervideo object. Each object (a, b, c, etc.) at this level 42 represents a collection of consecutive video frames (media data). Video meta-data layer 43 describes the narrative sequences and specifies the original sequencing of NSSs (A, B, C, etc.). It is assumed that these two layers 42 and 43, are outside of the control of the filtering systems, as for instance, the case if the video is stored on a DVD. Filtering meta-data layer 44 contains the meta-data being used by the filtering system. This includes sequencing information (solid lines between filtering meta-data units), identification of anchorable information units and hyperlinks (dashed lines between filtering meta-data units), and parameters associated with narrative sequences and hyperlinks for filtering and payment purposes. Filtering meta-data layer 44 also contains references to the next layer 45 where the payment objects and the payment scheme are defined.

The following describes how hypervideo should be analyzed and indexed to generate the filtering meta-data needed. This is performed in service administration system 30 of FIG. 1. The first three steps are only needed if the video to be indexed is stored on a video tape or another medium without direct access to individual shots or scenes. In some cases, the video is already segmented and indexed. This might be the case for videos stored on DVDs and for videos stored in a digital archive as, for instance, described by Hjelsvold et al. 1998.

FIG. 3 illustrates the first step of the present invention which is the digitizing of video tape 46. The video is digitized to generate a stream of raw video data 47 that can be further processed.

FIG. 4 illustrates the second step of the present invention which is that video shots, scenes and narrative sequences of scenes 50 are determined. Individual shots, scenes, and narrative sequences of scenes 50 have to be determined because these are the building blocks in defining the hypervideo units to be filtered. This can either be done manually, automatically by a video processing system, or semi-automatically in a hybrid system. This is described by R. Depommier, N. P. Fan, K. Gunaseelan, R. Hjelsvold, S.-P. Liou and E. Stiller-Erdpresser in "CARAT-ARC: A Scaleable And Reliable Digital Media Archiving System", *Proceedings Of The IEEE International Conference On Image Processing*, 1997.

FIG. 5 illustrates how meta-data 51 are generated and how a hypervideo structure is built up. Meta-data 51 are generated to define the NSS sequencing, to identify the AIUs, and to add hyperlinks between these AIUs. This step is not necessary when the hypervideo represents a traditional video with sequential ordering of NSSs in the order they appear in the input video and with no AIUs and hyperlinks defined. In this case, meta-data 51 will only define the standard sequencing of the NSSs. When this step is completed, digital video content (NSSs) 52 will be stored in a digital video repository 53 (11 of FIG. 1) while video meta-data 51 specifying NSS sequencing and defining AIUs are stored in meta-data database 54 (12 of FIG. 1). Repository 53 and database 54 may be managed by the same database system, may be collocated on the same computer system but managed by different systems, or may be stored and managed on separate computer systems.

Figure 6:
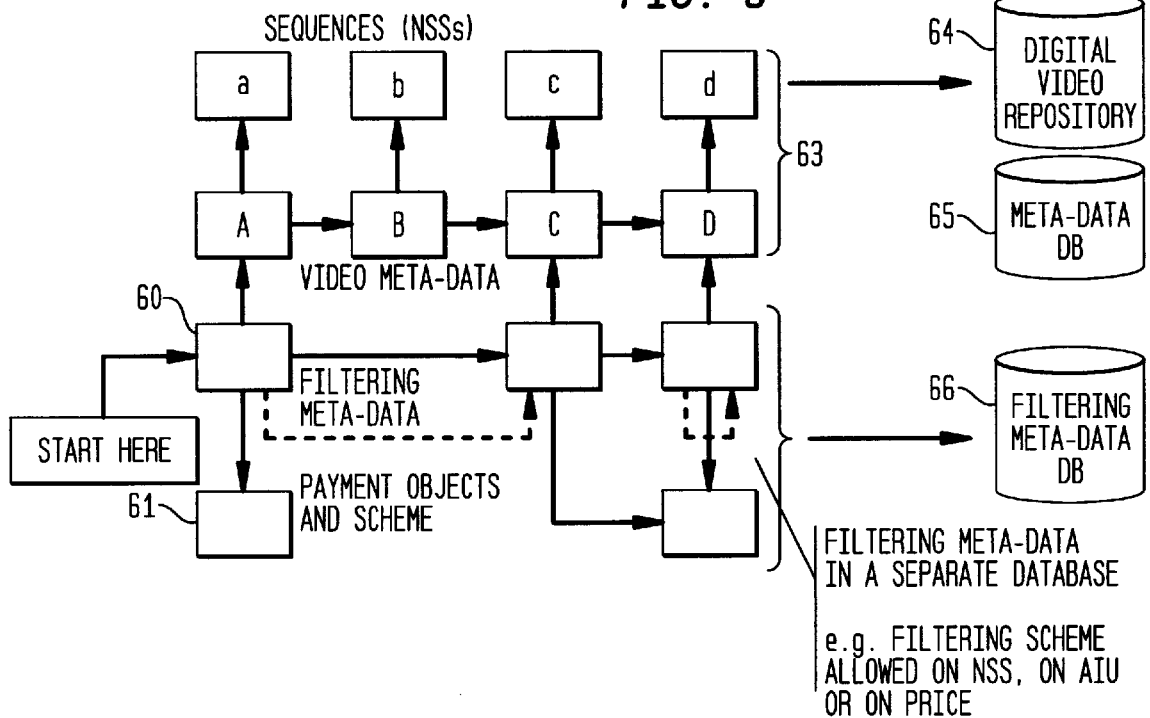
FIG. 6 illustrates a fourth step of the present invention which is filtering meta-data and adding payment schemes and values.

FIG. 6 illustrates the filtering of meta-data and the adding of payment schemes and values. Filtering meta-data 60, payment meta-data 61 and video meta-data units 62 are associated with filtering and payment. In this step the sequencing of NSSs and the definition of AIUs from FIG. 5 can be extended and modified, automatically or manually. Also, the associations between these units 63 and the payment information are established during this step. Digital video repository 64, meta-data database 65 and filtering meta-data database 66 are also shown.

A buying customer may establish a connection to the hypervideo merchant's server to buy hypervideo information. The following will describe how the video is filtered by filtering server, 10 of FIG. 1, according to a user's price selection, how an electronic payment transaction is integrated, and how delivery of the filtered hypervideo is initiated and monitored. A detailed description of filtering and payment meta-data is given below.

Figure 7:
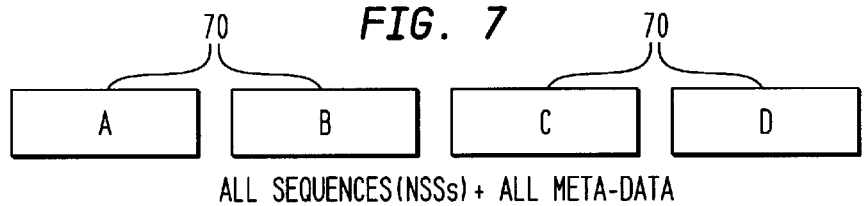
FIG. 7 illustrates a detailed step within filtering which is selection of Narrative Sequences of Scenes (NSSs) or videos to be viewed.

FIG. 7 illustrates the first step in filtering, payment and delivery which is the selection of NSSs or videos to be viewed. The present invention defines two main approaches that can be used by the customer to select the NSSs or videos to be viewed. First, the customer may browse a catalog of available hypervideo. Alternatively, the customer may make a query for NSSs associated with a certain topic. The customer may now make a selection among the NSSs the customer is authorized to view based on his or her interest. The customer's selection represents a hypervideo 70 which includes all potential videos, scenes (NSSs) and hyperlinking (AIUs) that were selected. All sequences can be selected and streamed. This content is physically available on appropriate media (conventional hard drives, DVDs ROMs, memory or storage devices of any type that can be accessed by one or several workstations or servers). The corresponding meta-data is being used by subsequent filtering and payment computation steps.

Figure 8:
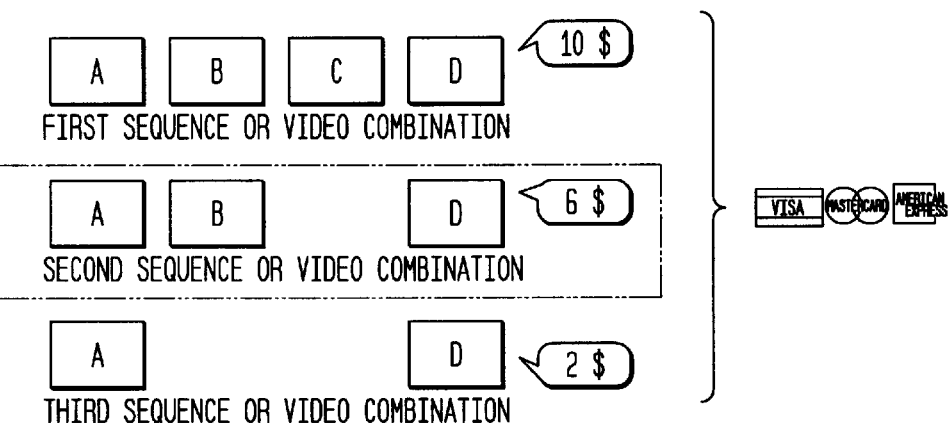
FIG. 8 illustrates a detailed step within filtering which is calculating one or more prices according to payment or customer profile.

FIG. 8 describes the second step, how one or multiple prices are calculated according to payment or customer profile. The filtering service may define several payment schemes. Such schemes are discussed in more detail below. These schemes are now analyzed together with the filtering meta-data to present to the user a price choice. Assume, for instance, that the price calculation process in this example identified three different combinations of hypervideo sequences (NSSs) and calculated the relevant prices. The customer then selects one video combination according to the given prices and selects the preferred credit card. This is illustrated in FIG. 8.

In the next step, step 3, the customer makes a selection and the SET payment transaction is launched. The calculated prices are presented to the customer along with information describing the alternative versions of the selected video. This information may include the duration of the video, a textual description of the version (e.g., complete coverage, or highlights). Based on this information, the customer may select the specific version he or she wants to buy. Once the specific version has been selected the user has to provide electronic payment information (e.g., credit card information) that can be used in an electronic transaction. A Secure Electronic Transaction is launched between the customer and the merchant and between the merchant and a payment gateway (28 of FIG. 1) to verify that the payment information is valid and that credit limits are not exceeded.

Figure 9:
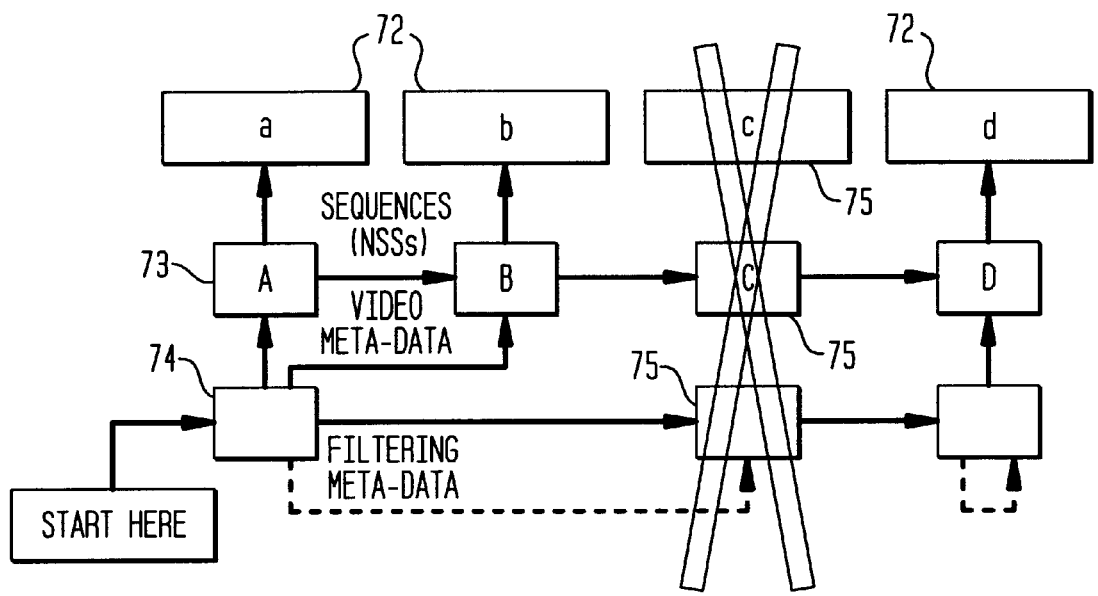
FIG. 9 illustrates a detailed step within filtering which is performing the payment transaction.

In step 4, the payment transaction is performed successfully. If the payment information is accepted by the payment gateway (28 of FIG. 1) a payment transaction occurs between the merchant's bank and the buyer's bank. The merchant server connected to the hypervideo server is informed about the positive transaction result. The next step is to apply service filters to the selected video to generate the version for which payment was cleared. If, however, the payment information was not accepted by the payment gateway, the rejection is forwarded to the customer who is then given the opportunity to make a different selection or to provide additional payment information. FIG. 9 illustrates the transaction with sequences 72, video meta-data 73, and filtering meta-data 74 with hyper video elements 75 that are not part of the selected version and should not be delivered within the initiated thread.

Figure 10:
FIG. 10 illustrates an example of the results of filtering.

In step 5, the filtering process is initiated. If the payment transaction was successfully completed the filtering process can be initiated to determine which content to be delivered to the customer. The customer should only receive hypervideo elements that are part of the version for which the payment was made. The filtering process uses filtering meta-data to determine which NSSs and AIUs should be removed from the stream delivered to the customer. Although the physical data is still available on the hypervideo server, these elements will appear as being "removed" from the video that is delivered to the end-user. Referring to the previous example, the hypervideo server would now deliver the sequences 76 shown in FIG. 10 to the customer. Sequence "c" has been dropped along with all hyperlinks pointing to AIUs within it.

Figure 11:
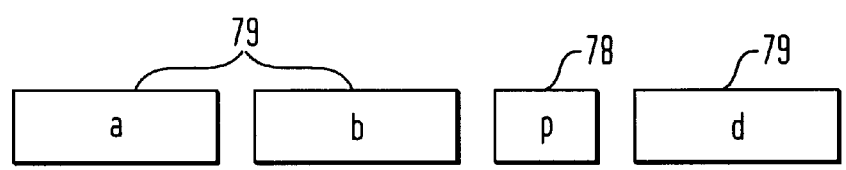
FIG. 11 illustrates a detailed optional step within filtering which is inserting a promotional video.

In step 6, depending on the payment scheme, the version selected by the customer might allow for automatic insertion of promotional video sequences 78 into regular sequences 79. The method for selecting the sequences to be inserted and the method for determining where to insert these sequences will be further discussed below. Referring to the previous example and assuming that the version selected by the user allows for insertion of promotional video, promotional sequence "p" 78 is inserted as illustrated in FIG. 11 showing selected NSSs before the streaming process starts.

Figure 12A:
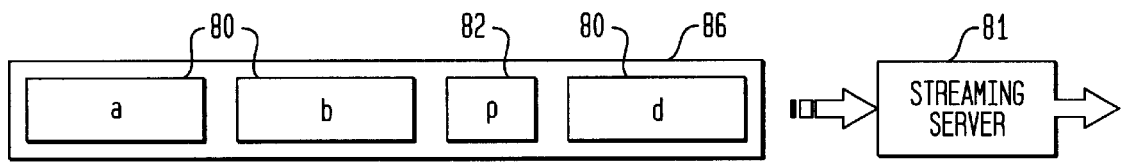
FIG. 12 illustrates a detailed step within filtering which is copying sequences and AIU's to streaming server.
Figure 12B:
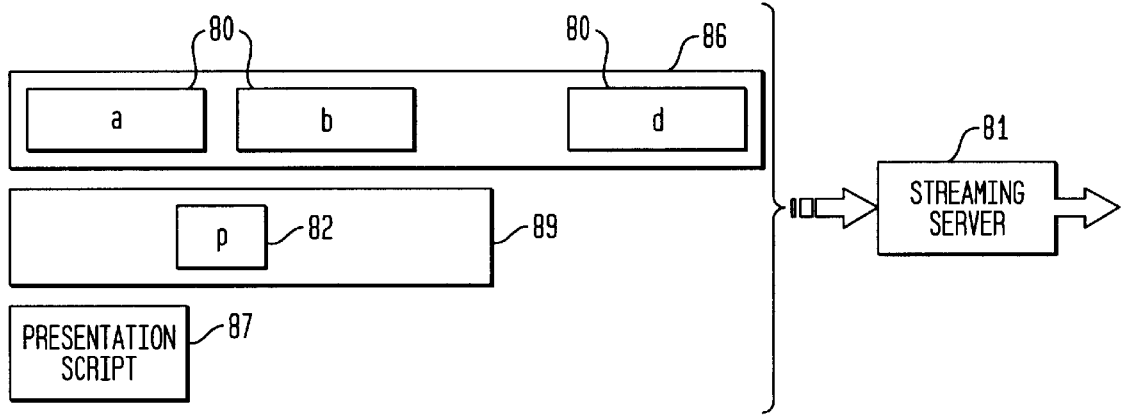

In step 7, files are copied to the streaming server. The files to be copied depend on the functionality of the streaming server. No file will be copied if it is already stored in the streaming server, for instance, due to a previous request for the same version of the video. If the server does not support playing back a script, as shown in FIG. 12a, the sequences and AIUs 80 are reassembled and combined together with promotional sequence inserts 82 to form a streaming file 86 that is copied to streaming server 81. The video may also be transcoded if the streaming format is different from the original format of the video or if the hypervideo data could also be transcoded into the proper streaming format (e.g. Microsoft NetShow ASFv2 or Real Network video player format) before being copied to the streaming server 81. On the other hand, if the server supports playing back script files, as shown in FIG. 12b, a presentation script file 87 needs to be copied to streaming server 81 along with media file(s) 88 containing sequences and AIUs 80 being addressed by the script and promotional sequence file(s) 89 containing promotional sequence inserts 82. The presentation script file 87 specifies the locations of sequences and AIUs 80 and promotional sequence inserts 82 within the media files 88 and promotional sequence files 89 and specifies how these elements are to be assembled by the streaming server. If the streaming server does not support script file directed streaming, the NSSs and AIUs that passed the filtering step will now be reassembled and combined together with promotional sequence inserts 82 to create the version that was selected by the customer. The necessary files are now copied to the streaming server 81. The video may also be transcoded if the streaming format is different from the original format of the video or the hypervideo data could also be transcoded into a commercial streaming format (e.g. Microsoft NetShow ASFv2 or Real Network video player format) and stored in the streaming server 81.

Figure 13:
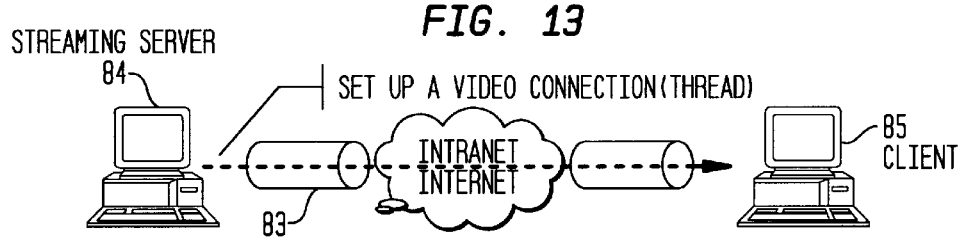
FIG. 13 illustrates a detailed step within filtering which is initiating the streaming process.

As soon as the filtering process is completed the streaming process, step 8 as shown in FIG. 13, can be initiated where streaming application thread 83 can be opened between video server 84 and client browser 85. The appropriate streaming player is started within the client browser to receive and display hypervideo data. The customer may activate any of the hyperlinks to AIUs located within the scope of the hypervideo. Also, the customer may activate hyperlinks to AIUs outside of the scope of the filtered video. This will implicitly start a new price negotiation and filtering process as described in step 2 above.

Figure 14:
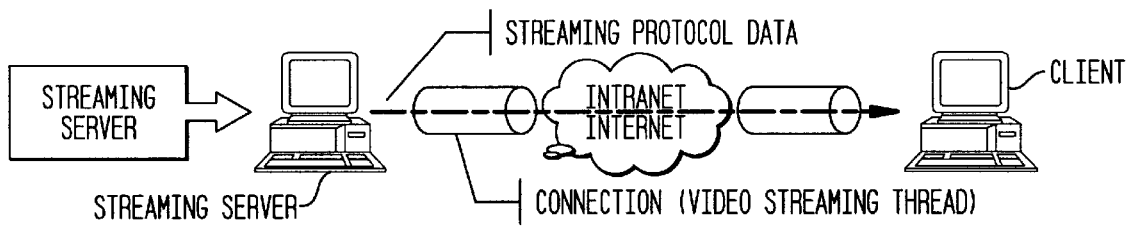
FIG. 14 illustrates a detailed optional step, within filtering which is monitoring the streaming process.

In step 9, an optional step, the merchant may have the streaming process monitored to keep exact records of which parts of the selected hypervideo was actually delivered to the customer. This information can be used as input to step 11. This step is shown in FIG. 14.

Figure 15:
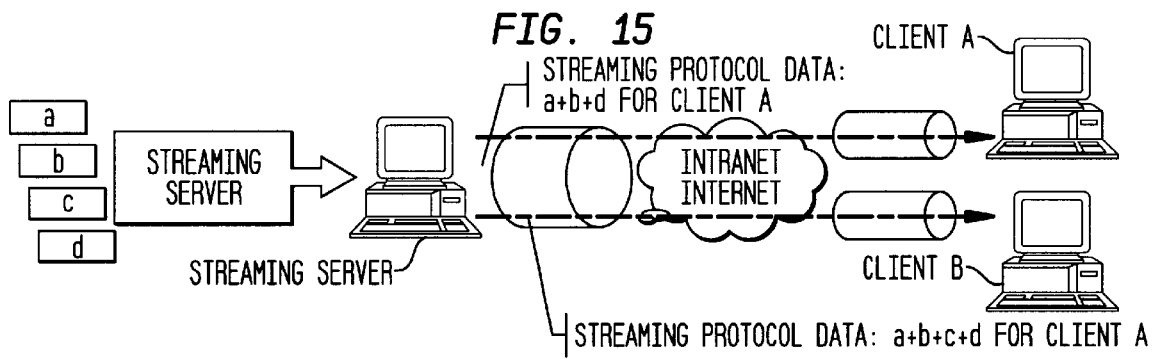
FIG. 15 illustrates a detailed step within filtering which is initiating and starting another streaming process.

In step 10, another streaming process with another client is initiated and started. Assuming that a similar process is initiated by another client and that streaming sequences A+B+C+D have been selected, the streaming server builds up two different application threads and the streaming data shown in FIG. 15 is sent over two different connections. Only one physical connection to the Intranet/Internet service provider is required. The initial video content is the same and is stored only once but, without creating additional video data, the streaming process generates in real time two different versions using the same primary digital video content. If possible, the hypervideo data stored in the streaming server will also be shared between concurrent sessions or reused by subsequent sessions.

In step 11, another optional step, the customer is reimbursed for hypervideo elements not consumed if such a payment scheme exists. The detailed record from the monitoring done in step 9 will be analyzed to identify elements not consumed. The accumulated price for these elements are calculated. A Secure Electronic Transaction (SET) is established between the merchant and the payment gateway to reimburse the customer. Once the reimbursement has been completed, this information is also sent to the customer.

The following will provide a detailed description of the filtering process. This description is divided into three sections, the first section describing filtering of narrative sequences, the second section describing filtering of hyperlinks, and the third section describing automatic insertion of promotional video sequences.

Narrative sequences of scenes filtering is the type of filtering that is used to define which narrative sequences are being included in a specific version of a hypervideo. It should be noted that each version might freely combine NSSs from the original (unfiltered) hypervideo. Thus, some of the NSSs from the original hypervideo might not be used in any of the filtered versions, some might be used in one filtered version only, and some might be shared among several different versions.

The following will describe basic sequence filtering. A filtering service defines which parameters are to be used for filtering. The filtering meta-data associated with a hypervideo specifies which values are given to each NSS for these parameters. The filtering parameters for a hypervideo filtering service may, for instance, be depth_of_coverage and type_of_information. The first parameter, depth_of_coverage, might take values complete_coverage, intermediate_coverage, and highlights. The second parameter, type_of_information, might take values management_information, sales_information, and technical_information. Each NSS specifies which values each of these parameters takes. If no value is given for these parameters, the NSS will not be included in any version of the hypervideo. If several values are given for these parameters, the NSS will be included in several versions.

Also, it is possible for each filtering service to define the types of versions it offers. For instance, a filtering service might define three types of versions, gold version, silver version, and standard version. The filtering service meta-data also specifies which filtering parameter values are associated with each of the versions. The gold version mentioned above, for instance, might take value complete coverage for the depth of coverage parameter and management information and sales information for the type of information parameter.

The following will describe hierarchical filtering. As described by Hjelsvold et al. 1998, a video (and implicitly a narrative sequence of scenes) can be structured into a hierarchical composition. A television news broadcast, for instance, might be composed of news stories that again are composed of sub-stories or video shots. In such a hierarchy, the parameters associated with a parent node should also cover the children. For instance, if a news story is classified as being related to sales information, all sub-stories and shots belonging to this story would also (implicitly) be classified as sales information. If a filter determines that a node in such a hierarchical composition should not be included in a specific version, none of the sub-elements of the given node will be included either. On the other hand, if the node is passing the filter but some of the sub-elements do not, only the specific sub-elements will be removed when creating the filtered version.

The following will describe parallel track filtering. If the hypervideo specifies parallel tracks of information to be streamed, the filtering service will define whether the various tracks are filtered together or separately. If the tracks are to be filtered together and an NSS is not to be included in the filtered version of the hypervideo, the information that originally was scheduled to be streamed on the other tracks will not be included in the filtered version of these tracks either. If the tracks are to be filtered separately, the other tracks are not affected. Synchronization between the tracks is still maintained, however, so no information is delivered to the customer for the track that has been filtered out for a period of time.

If the alternative streams can be fed into a specific track, the payment information may be used to select the specific stream to be delivered. Again, this depends on the match between the filtering parameter values for the specific version of the hypervideo and the parameter values assigned to each alternative stream.

The following will describe hyperlink filtering. Hyperlinks allow the user to follow references from one AIU to another. (The destination AIU may be any information unit such as a text document, a time point within an NSS or a spatio-temporal part of a NSS.) Before describing the hyperlink filtering in more detail we will describe how some hyperlinks are automatically created when a hypervideo is being prepared for a filtering service.

The automatic hyperlinking analyzes parameters assigned to each AIU and analyzes automatic hyperlinking rules stored in the filtering meta-data to determine if a hyperlink should be automatically established between a NSS and another NSS or information unit. Assume, for instance, that the merchant offers instructional hypervideos for fix-it-yourself car mechanics. Assume also that the meta-data for all NSS in these hypervideos contains the names of the components being mentioned or used within the NSS. An automatic hyperlinking rule might define that whenever component is being referred to in the meta-data for a NSS a hyperlink should be created to the white paper for this component.

Hyperlinks will be filtered based on the filtering parameter values associated with the source and the destination AIUs. The hyperlink can only exist if both the source and the destination AIUs passes the filtering process and are to be included in the filtered version of the hypervideo. If, on the other hand, one or both of the AIUs do not fulfill the filtering criteria, the hyperlink will not be included in the meta-data describing the filtered version.

With filtering based on link parameters, the meta-data associated with each hyperlink might also define the parameter values for which this hyperlink should be included. This allows the author of the hypervideo to restrict the possibility to follow certain hyperlinks based on the selected set of parameter values.

Figure 16:
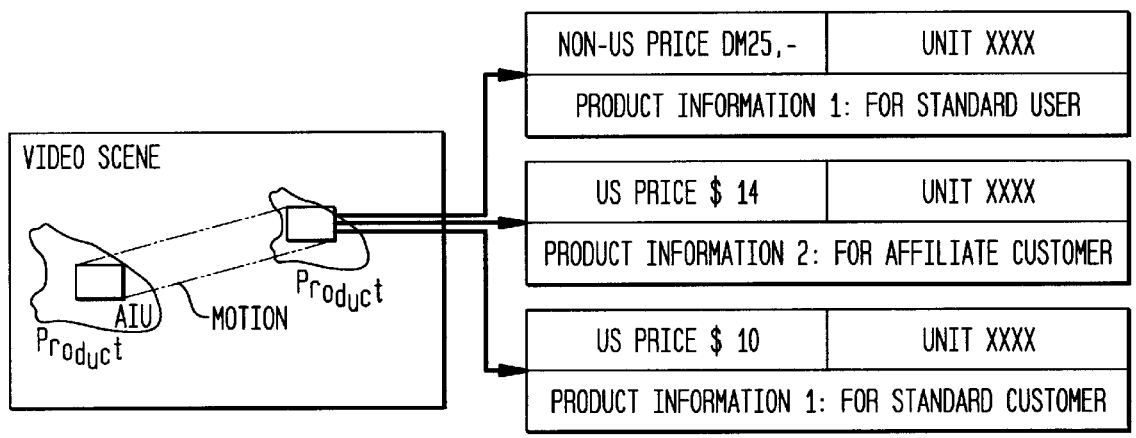
FIGS. 16 and 17 illustrate multidimensional hyperlinking using AIUs.

The following will describe multidimensional hyperlinking using AIUs. So far, it has been assumed that the hyperlinks connect two AIUs together, one source and one destination AIU. The filtering meta-data might also define multiple destinations AIU to be connected to one source AIU. Each branch of this multiple destination hyperlink should be associated with filtering meta-data for the system to choose the proper destination AIU once a set of filtering parameter values is selected. FIG. 16 illustrates an example where an AIU is the origin of three hyperlinks associated with different price selections. The filtering process will select only the hyperlink that is appropriate for the price category selected by the end-user and include it in the data stream. Thus, the user can but only access one of the defined information planes. This example doesn't include any video hyperlink.

Figure 17:
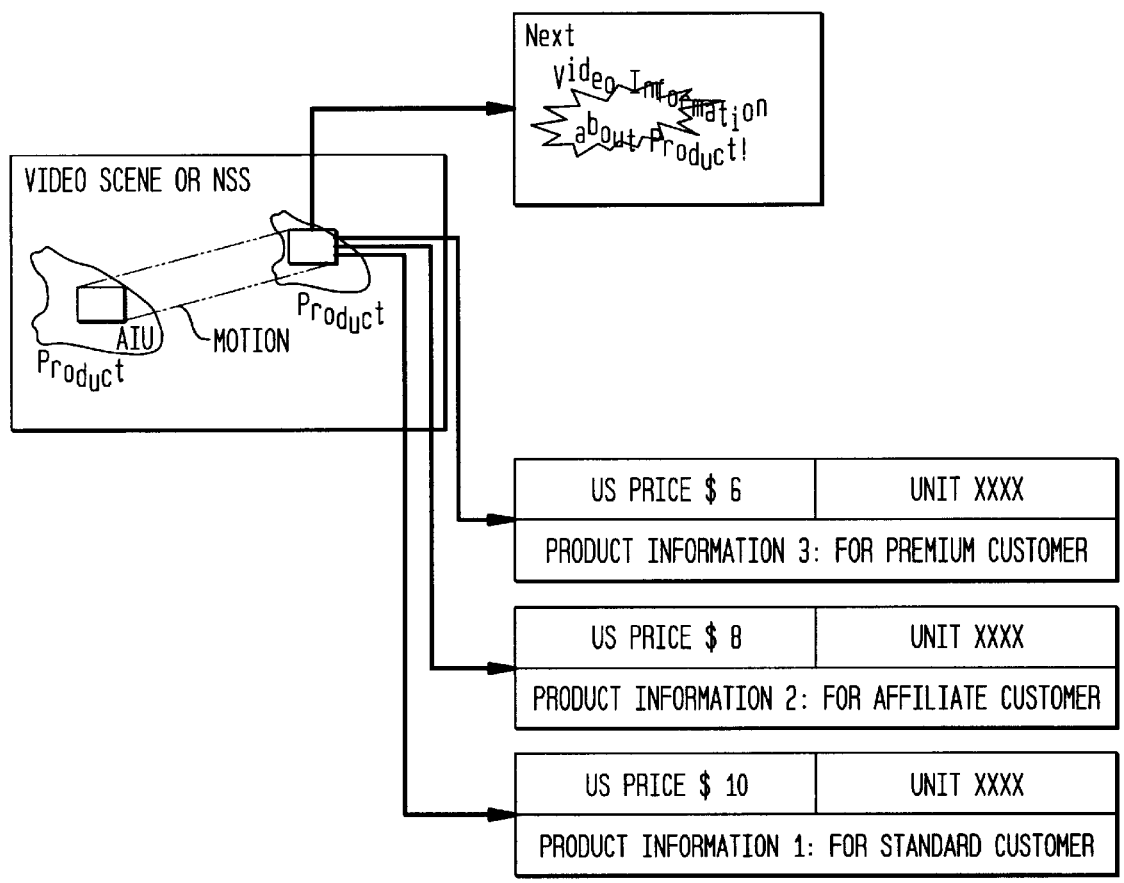

FIG. 17 illustrates an extension to the previous example, FIG. 16, where an AIU is associated with a product demonstrated on the video. This source AIU is again associated with three hyperlinks, one to be chosen for customers buying the premium version of the hypervideo, one for customers buying the affiliate version of the hypervideo, and one for standard customers. Also, the AIU contains a hyperlink to another NSS which will be sent to the end-user if the end-user selects the AIU. In this case, the same NSS will be shown to the end-user in all three versions of the hypervideo.

Figure 18:
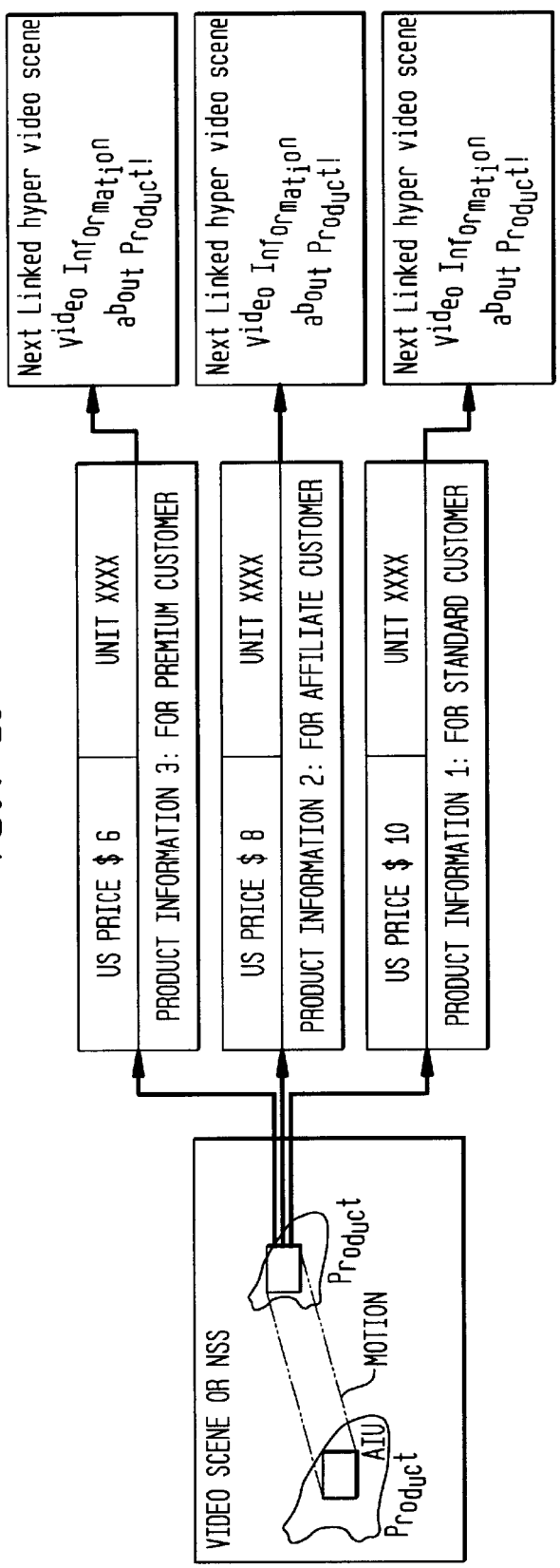
FIG. 18 illustrates version branching using AIUs.

FIG. 18 illustrates a similar scenario as the previous one, FIG. 17. The difference is that the hypervideo is also branching depending on which version the customer is viewing therefore showing version branching using AIU's.

The following will describe in detail automatic insertion of promotional video sequences. If the user accepts, promotional video sequences (such as TV commercials) will also be inserted into the video to be delivered. In addition, the end-user may be asked to complete questionnaires or user feedback forms.

The merchant may statically define which promotional video sequences or questionnaires are to be inserted into the different hypervideos. In addition, the filtering service may define parameters and selection rules for automatically selecting among available promotional video sequences or questionnaires. Alternatively, an off the shelf software package for advertisement selection could be used. The filtering service also specifies the amount of promotional video that can be inserted for a given version and the number of questions in the questionnaire. The filtering service meta-data is analyzed to find promotional video sequences and questionnaires that best matches the selection rules without overflowing the amount limits.

Again, the merchant may statically indicate the places in a hypervideo where promotional video might be inserted. Also, the filtering service may define parameters and insertion rules for automatically selecting the places where promotional video or questionnaires can be inserted. For instance, a filtering service for television news might define that promotional video sequences should only be inserted between news stories, that each "block" of promotional video should be no more than one minute long, and that the insertion points should be distributed equally over the course of the news. Also, the service might define that questionnaires should be presented between new stories, but as near the middle of the filtered video as possible.

The following will describe different purchasing models and payment schemes that will be used to compute the price for a selected version of a hypervideo. A distinction could be made between two different purchasing models into which the filtering and information delivery could be applied. The first enables a customer to subscribe to different qualities of information (for instance various levels of access to information provided by a call center or support center); the second allows the customer to select and purchase hypervideo information on-demand just like buying newspapers from a newsstand.

A subscription model assumes that the hypervideo merchant and the customer approve a subscription contract. This contract defines the lifetime of the subscription and renewal procedures. It also describes the payment options (payment parameters and billing information). In this model, end-users have to provide identification information (for instance account name and password) for the system to retrieve the pre-stored filtering parameters. The user will not have to or be able to make a price selection once the identity is verified.

The pre-stored parameters will be used as input to the filtering. There are two ways for a subscriber to purchase a hypervideo using a different payment option than the one defined by the current subscription. First, the user may decide to permanently upgrade or degrade the subscription. Second, the user may make a purchase following the newsstand model. The subscription model generates a much smaller number of payment transactions than the newsstand model. Thus, it improves the overall efficiency.

A newsstand model defines a more dynamic way to associate filtering and payment transaction. It is a case-by-case solution, where filtering parameters are determined for the current delivery session only. In this model, the customer will have to make a price selection for each hypervideo he or she wants to purchase. This model allows end-users to make casual and spontaneous purchases without having to subscribe to a service.

The following will describe multi-level pricing. In the simplest case, the price is independent from the actual video. The filter service example presented earlier (FIGS. 16–18) specified three types of hypervideo versions, the gold version, the silver version, and the standard version. The merchant may in this case define the price class to be used for each of these types of videos. Thus, for instance, the gold version of any of the videos may cost $10, the silver version $6, while the standard version may cost only $2.

Alternatively, the filtering meta-data may contain payment parameters that are associated with individual NSSs. In this case, the price would be computed based on the set of NSSs that are included in a given version. These parameters specify a price class that can later be converted to an exact price. Three different price elements may be used to compute the price of a given video in this case. One price element is the price class associated with the hypervideo itself, allowing each individual version of a hypervideo to be associated with a specific price class. This allows a filtered version of one hypervideo to have a price different from the same version of a different hypervideo.

The next price element is accumulating the price contributions from the sub-elements of the hypervideo. For instance, in a television news filtering system, each news story might be given a specific price class, and the price for a filtered version might be the computed by adding the price contributions for each of the stories together.

Another price element is related to the duration of the filtered video. Each NSS may be associated with a price class that would be mapped to a price per unit time. The price for the NSS would be computed by multiplying the price per unit time with the duration of the NSS.

The following will describe prices as a function of time. All price elements might also depend on the time at which the video was requested. The time varying price function has two elements. The absolute part defines the functional dependency between the price and the day and time of the request. It may, for instance, be more expensive to buy a financial news story in the middle of a working day than on Sunday morning. The relative part defines how the price changes relative to the age of the information object. A financial news story, for instance, may have a higher price immediately after being published than two days later.

For discount pricing, all price elements might be given negative values, for instance, to encourage customers to select versions containing promotional or advertising information.

Figure 19:
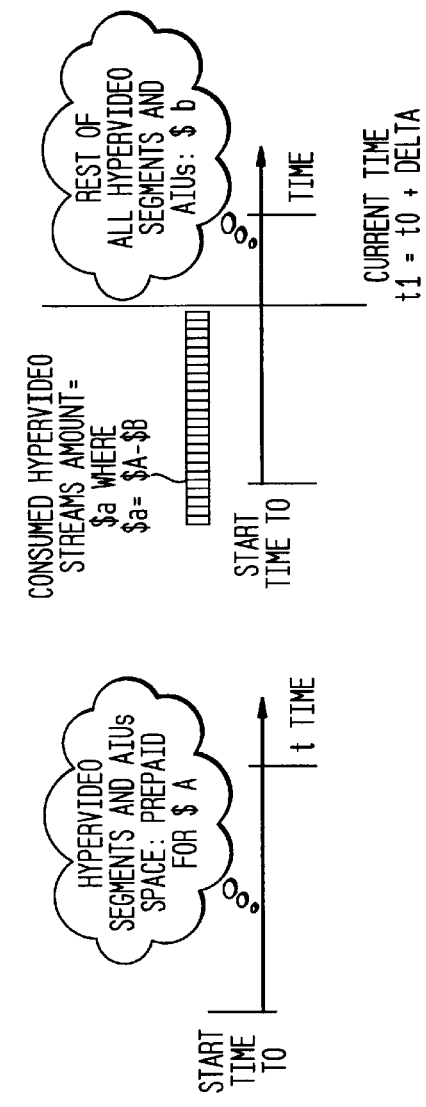
FIG. 19 illustrates a detailed optional step within filtering which is reimbursing the customer for hypervideo elements not consumed.

FIG. 19 describes refunding for hypervideo segments not consumed. In some business models, it would be necessary to refund the user for the parts of the ordered hypervideo that was not consumed if the end-user cancels the streaming process for some reason (such as connection failure, personal user's wish to break the session, unsuited content etc.).

If the payment scheme being used specifies that the end-user should receive such a refund, the delivery process will be monitored and a detailed usage record will be generated. When the end-user closes the video transfer session, the usage record will be consolidated and compared to the filtered video that the end-user ordered to determine which parts of the video the end-user did not consume. The system will then compute the corresponding value and refund this amount.

In summary, the present invention is a system for giving customers access to a subset of hypervideo items (a version) stored on a merchant's server based on a selected payment. The system does not require the use of encryption and sales of decryption keys. The system also allows the merchant to define parameters to be used for creating the various versions and for computing the price of the given version.

It is not intended that this invention be limited to the hardware or software arrangement, or operational procedures shown disclosed. This invention includes all of the alterations and variations thereto as encompassed within the scope of the claims as follows.

We claim:

1. A system for hypervideo filtering based on end-user payment interest and capability comprising:
    a filter server for interfacing with a client; and
    a service administration system connected to said filter server, wherein said filter server comprises:
        a www server for interfacing with said client;
        a commerce server connected to said www server;
        a transaction server connected to said commerce server;
        a database server connected between said www server and said service administration system;
        a filtering meta-data database connected to said database server;
        a media data server connected to said www server;
        an archiving system connected to said media data server and said database server; and
        a streaming server connected to said media data server.

2. A system for hypervideo filtering based on end-user payment interest and capability as claimed in claim 1, wherein said service administration system comprises:
    management tools connected to said filter server; and
    a meta-data editing tool connected to said filter server.

3. A system for hypervideo filtering based on end-user payment interest and capability as claimed in claim 1 wherein said service administration system comprises:
    a media file generator connected to said media data server and said database server; and
    a filtering process connected to said commerce server and said database server.

4. A system for hypervideo filtering based on end-user payment interest and capability as claimed in claim 1 wherein said archiving system comprises:
    a meta-data database connected to said database server; and
    a media data repository connected to said media data server.

5. A system for hypervideo filtering based on end-user payment interest and capability as claimed in claim 1 wherein said SET server connects to a clearing house comprising:
    a payment gateway.

6. A system for hypervideo filtering based on end-user payment interest and capability comprising:
- a filter server for interfacing with a client;
- a service administration system connected to said filter server; and
- an archiving system connected to said filter server, wherein said filter server comprises:
  - a www server for interfacing with said client;
  - a commerce server connected to said www server;
  - a transaction server connected to said commerce server;
  - a database server connected between said www server and said service administration system;
  - a filtering meta-data database connected to said database server;
  - a media data server connected to said www server; and
  - a streaming server connected to said media data server.

7. A system for hypervideo filtering based on end-user payment interest and capability as claimed in claim 6, wherein said service administration system comprises:
- management tools connected to said filter server; and
- a meta-data editing tool connected to said filter server.

8. A system for hyprvideo filtering based on end-user payment interest and capability as claimed in claim 6, wherein said archiving system comprises:
- a meta-data database connected to said filter server; and
- a media data repository connected to said filter server.

9. A system for hypervideo filtering based on end-user payment interest and capability as claimed in claim 6 wherein said www server comprises:
- a media file generator connected to said media data server and said database server; and
- a filtering process connected to said commerce server and said database server.

10. A system for hypervideo filtering based on end-user payment interest and capability as claimed in claim 6 wherein said transaction server connects to a clearing house.

11. A method for hypervideo filtering based on end-user payment interest and capability comprising the steps of:
- digitizing a video tape into raw video data;
- determining video shots, scenes and NSSs;
- generating meta-data to define NSS sequencing, to identify AIUs and to add hyperlinks between said AIUs; and
- filtering said meta-data, wherein filtering said meta-data comprises the steps of:
  - narrative scenes filtering; and
  - hyperlink filtering, and wherein narrative scenes filtering comprises the steps of:
    - basic sequence filtering;
    - hierarchical filtering; and
    - parallel track filtering.

12. A method for hypervideo filtering based on end-user payment interest and capability comprising the steps of:
- digitizing a video tape into raw video data;
- determining video shots, scenes and NSSs;
- generating meta-data to define NSS sequencing, to identify AIUs and to add hyperlinks between said AIUs; and
- filtering said meta-data, wherein filtering said meta-data comprises the steps of:
  - narrative scenes filtering; and
  - hyperlink filtering comprises the steps of:
    - automatic filtering;
    - AIU parameter filtering;
    - link parameter filtering;
    - multidimensional hyperlinking using said AIUs; and
    - version branching using said AIUs.

13. A system for hypervideo filtering based on end-user payment interest and capability comprising:
- a filter server for interfacing with a client; and
- a service administration system connected to said filter server;
- wherein said filter server comprises:
  - a www server for interfacing with said client;
  - a commerce server connected between said www server and said client;
  - a transaction server connected to said commerce server;
  - a database server connected to said www server;
  - a media data server connected to said www server;
  - a data database connected to said database server and said media data server; and
  - a streaming server connected between said media data server and said client.

* * * * *